United States Patent [19]
Gimbel et al.

[11] Patent Number: 5,468,014
[45] Date of Patent: Nov. 21, 1995

[54] MOTOR VEHICLE SEAT WITH CHILD'S SAFETY SEAT ATTACHMENT

[75] Inventors: Hans-Peter Gimbel, Trebur; Walter P. Trutter, Wiesbaden; Martin Specht, Feldafing, all of Germany

[73] Assignee: General Motors Corporation, Detroit, Mich.

[21] Appl. No.: 161,387

[22] Filed: Dec. 6, 1993

[30] Foreign Application Priority Data

Dec. 23, 1992 [DE]   Germany ............. 42 43 826.8

[51] Int. Cl.⁶ ..................................... B60R 21/32
[52] U.S. Cl. ............... 280/735; 180/268; 280/30; 280/732; 297/216.11; 297/256.12
[58] Field of Search ................ 280/30, 730 R, 280/735, 732, 728 R; 180/268; 297/216.11, 250.1, 256.15

[56] References Cited

U.S. PATENT DOCUMENTS

| 3,745,523 | 7/1973 | Lewis et al. | 280/728 R |
| 3,992,028 | 11/1976 | Abe et al. | 280/728 |
| 4,896,894 | 1/1990 | Singletary | 280/30 |
| 5,074,583 | 12/1991 | Fujita et al. | 280/732 |

FOREIGN PATENT DOCUMENTS

| 3850 | 9/1979 | European Pat. Off. ............ 297/250.1 |
| 0284770 | 2/1988 | European Pat. Off. . |
| 0302607 | 7/1988 | European Pat. Off. . |
| 0485121 | 11/1991 | European Pat. Off. . |
| 2712917 | 9/1978 | Germany ............ 297/250.1 |
| 4214222 | 4/1993 | Germany ............ 280/728 R |

*Primary Examiner*—Eric D. Culbreth
*Attorney, Agent, or Firm*—Ernest E. Helms

[57] ABSTRACT

For a motor vehicle with at least one passenger seat which has attachment devices for a child's safety seat that can be attached to it and at least one air bag in the region of the passenger seat, the invention proposes that at least one attachment device for the child's safety seat be provided with a sensor for deactivating the air bag which reacts to the attachment of the child's safety seat. This assures that during the transportation of the child in the child's safety seat, the air bag in front of the child's safety seat is deactivated.

17 Claims, 4 Drawing Sheets

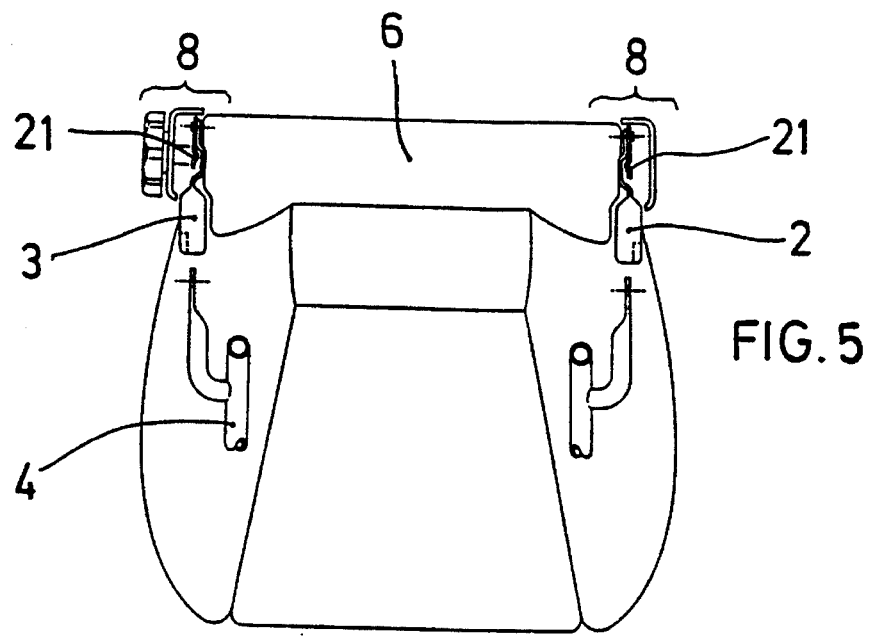
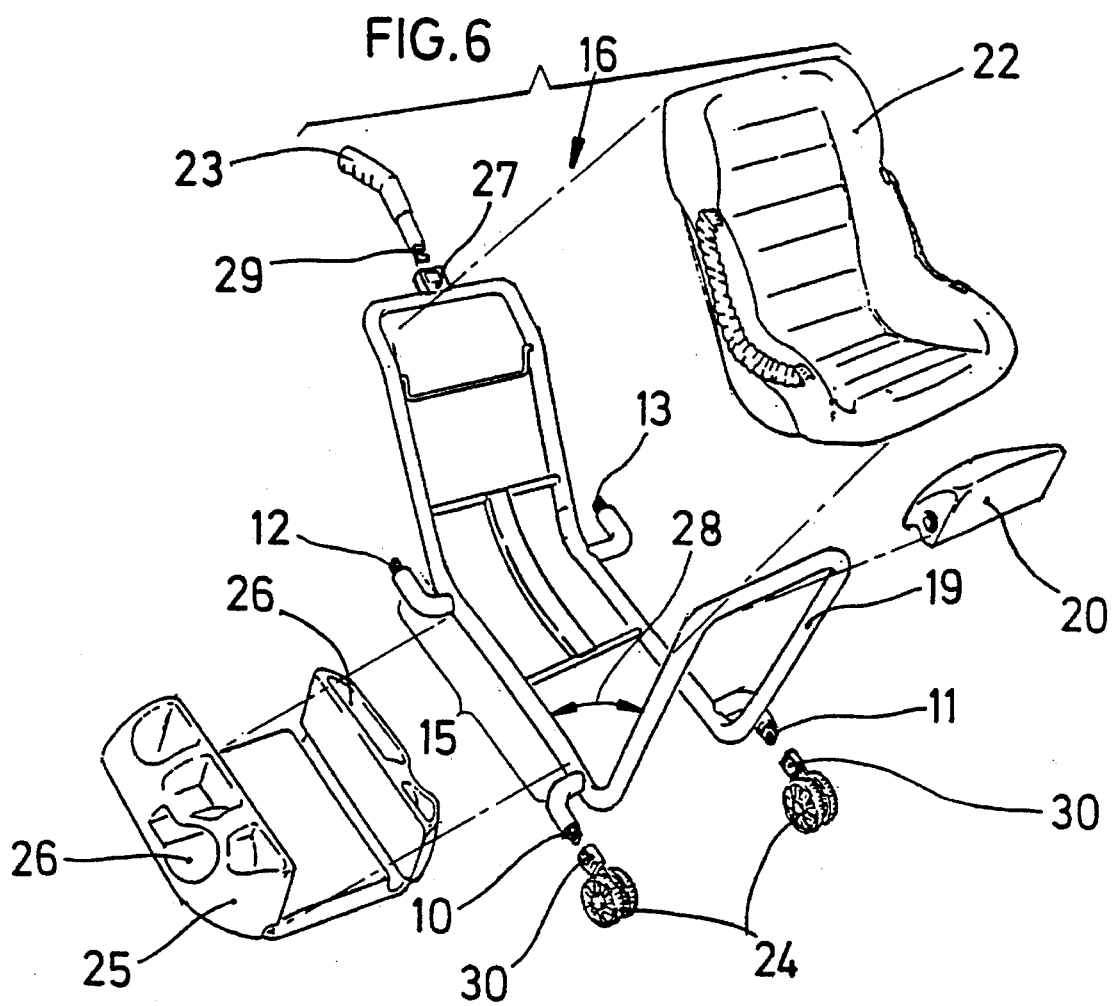

MOTOR VEHICLE SEAT WITH CHILD'S SAFETY SEAT ATTACHMENT

This invention pertains to a motor vehicle seat with at least one passenger seat which has attachment devices for a child's safety seat that can be attached to it and at least one air bag in the region of said passenger seat as well as to a corresponding child's safety seat.

BACKGROUND OF THE INVENTION

In motor vehicles of the type mentioned, a child's safety seat is usually attached to the passenger seat together with the child to be transported using safety belts and belt locks which are present on the passenger seat and/or child's safety seat. If the child's safety seat has a belt to hold the child, only the child's safety seat is fastened with the safety belt present on the passenger seat. The disadvantage here is that the air bag, which is located, viewed in the direction of travel, in front of the child's safety seat, depending on the nature of the child's safety seat and the position of the child in the safety seat, may represent a considerable danger to the child in the case of its activation.

In order for the child in the safety seat to be better protected and better monitored, the child's safety seat is frequently positioned on the passenger seat, especially on the front passenger seat, with the back cushion part to the front in the direction of travel and secured with a safety belt. This inherently advantageous positioning of the child's safety seat on the passenger seat, however, is not acceptable on a vehicle of the type mentioned above for safety reasons because, in the case of a collision, the opening air bag will strike against the back rest of the child's safety seat and thus would cause serious injuries to the child. To avoid this, the child's safety seat must be positioned in such vehicles exclusively with the back rest part to the rear, which again entails the above-described disadvantages.

For all types of attachments mentioned above, the child's safety seat could not until now be fastened to the passenger seat on all sides. Especially in the transverse direction of the vehicle, the child's safety seat with the child may shift relative to the passenger seat. This mobility of the child's safety seat may considerably reduce the safety of the child, e.g., in sharp turns or in the case of side collisions.

SUMMARY OF THE INVENTION

Accordingly, the purpose of the present invention is to modify a vehicle of the type mentioned above in such a way that the safety of a child being transported in a child's safety seat is further increased and the attachment of the corresponding child's safety seat to the passenger seat is simplified.

According to the invention, this problem is solved by the fact that at least one fastening device for the child's safety seat is provided with a sensor reacting to the fastening of the child's safety seat by deactivating the air bag, in which case the child's safety seat has at least one catch connected to it which collaborates with the attachment device at the time when the child's safety seat is fastened in.

By this design, when necessary, the air bag located in the region in front of the child's safety seat in the vehicle can be deactivated or shut off during transportation of the child. The child's safety seat in this case is firmly connected to the passenger seat in a simple way so that it cannot execute movements in the transverse direction of the vehicle.

The sensor for deactivating the air bag can be designed as a pulse emitter acting on the air bag control and be located inside or outside the attachment device. When the child's safety seat is attached to the passenger seat, the pulse emitter which reacts to the corresponding catch on the child's safety seat generates a signal which deactivates the air bag located in the region in front of the child's safety seat. The child's safety seat at that time can be positioned with the back support part forward in the direction of travel as well as with the back support part to the rear, opposite the direction of travel, on the passenger seat.

The signal of the sensor may also be utilized for triggering a warning indicator to properly connect the child's safety seat to the passenger seat. At this time, for example, an indicator located on the instrument panel may indicate optically or acoustically the status of the connection of the child's safety seat to the passenger seat, e.g., at the time when the child's safety seat is fastened or when the motor vehicle starts. With this design, all of the attachment devices on the passenger seat must be equipped with sensors.

To simplify the fastening of the child's safety seat to the passenger seat, the fastening devices can be designed as catching/engaging attachment devices which contain known means of engagement. The attachment devices may be arranged in each case on both sides of the seat cushion of the passenger seat or in the region of the neck between the back rest and the seat cushion and be connected to the supporting structure of the passenger seat, e.g., at the lower region of the back rest of the passenger seat or to the substructure, e.g. , in the case of passenger seats on the floor. As a result, a favorable attachment or catching device for the child's safety seat is created which runs approximately parallel to the seat cushion so that no additional forces and moments are transmitted to the child's seat in the case of stress on the attachment devices during braking or in the case of a collision.

The attachment devices can be connected very simply to the supporting structure of the passenger seat if the latter is arranged on both sides of the passenger seat in the region of the stationary back rest metal fittings. The attachment devices in this case may also be connected directly to the back rest fittings, e.g., by means of a screw connection.

According to a preferred version, the attachment devices may be designed in the form of belt locks for safety belts which collaborate with the catches of the child's safety seat, in which case the attachment devices differ in position and site of installation on the passenger seat from the existing safety belt locks.

As attachment devices for the child's safety seat, one may use the belt locks already present for the safety belts if, according to another version of the invention, these belt locks are arranged on the passenger seat in such a way that secure fastening of the child's safety seat to the passenger seat is guaranteed. For this purpose, only the belt locks in the longitudinal and transverse direction of the vehicle used for this purpose need be locked.

With these designs, for the same passenger seat, the safety belt may be used for a passenger or be attached to the child's safety seat for the transportation of a child.

The child's safety seat according to this invention can be mounted on the passenger seat with the back rest to the front in the direction of travel if, on one end of the seat-holding zone facing away from the back rest part, catches are present on both sides which interact with the attachment devices on the passenger seat. In this case, the child's safety seat is simply held by the catches, which are formed from well-known means such as plug-in locks for safety belts and are firmly connected in the seat-holding zone to the supporting structure of the child's safety seat, to the attachment devices.

An alternative attachment of the child's safety seat to the passenger seat in which the child's safety seat is positioned with the back rest to the rear against the direction of travel can be made possible by arranging catches on both sides at one end of the seat-holding zone facing toward the back rest part.

According to another preferred version, the catches in the seat-holding zone are firmly connected to the supporting structure of the child's safety seat which may be designed as a supporting frame. All the necessary parts of the child's safety seat such as the seat shell, the bottom part of the seat, the cushioned parts, etc., can be mounted on the supporting frame. In this case, the supporting frame may consist of a rod or tube profile to which the catches are attached by means of a screw connection or by welding.

In order to hold the child's safety seat attached to the passenger seat firmly against swiveling upward, the supporting frame has a support bracket firmly connected to it. The support bracket is angled against the seat-holding zone in such a way that it may be braced upon the attachment of the child's safety seat to the back rest of the passenger seat which is in a normal position suitable for sitting. The support bracket in this case may be provided with a cushioned part to protect the seat cover.

Since the child's safety seat is thus braced on the seat cushion on the one hand and on the back cushion of the passenger seat on the other, it is held firmly on the passenger seat on all sides.

The child's safety seat can be modified for the carrying of a child outside of the motor vehicle on the street in a simple manner if the catches of the support frame facing away from the back cushion part of the child's safety seat hold roll-equipped catching devices, and the catching device located on the side of the back rest part on the upper horizontally running segment of the support frame holds a catch of a hand grip. The above-mentioned catching devices may also consist of known interlocking means.

BRIEF DESCRIPTION OF THE DRAWINGS

This invention is illustrated in detail in the following with reference to the examples of its embodiment shown in the drawings. Partially schematically they show:

FIG. 5 is a top view of a passenger seat with attachment devices arranged in the region of the stationary back rest metal fittings.

FIG. 6 is an exploded view of the child's safety seat in FIG. 1.

DESCRIPTION OF THE PREFERRED EMBODIMENT

Figure 1:
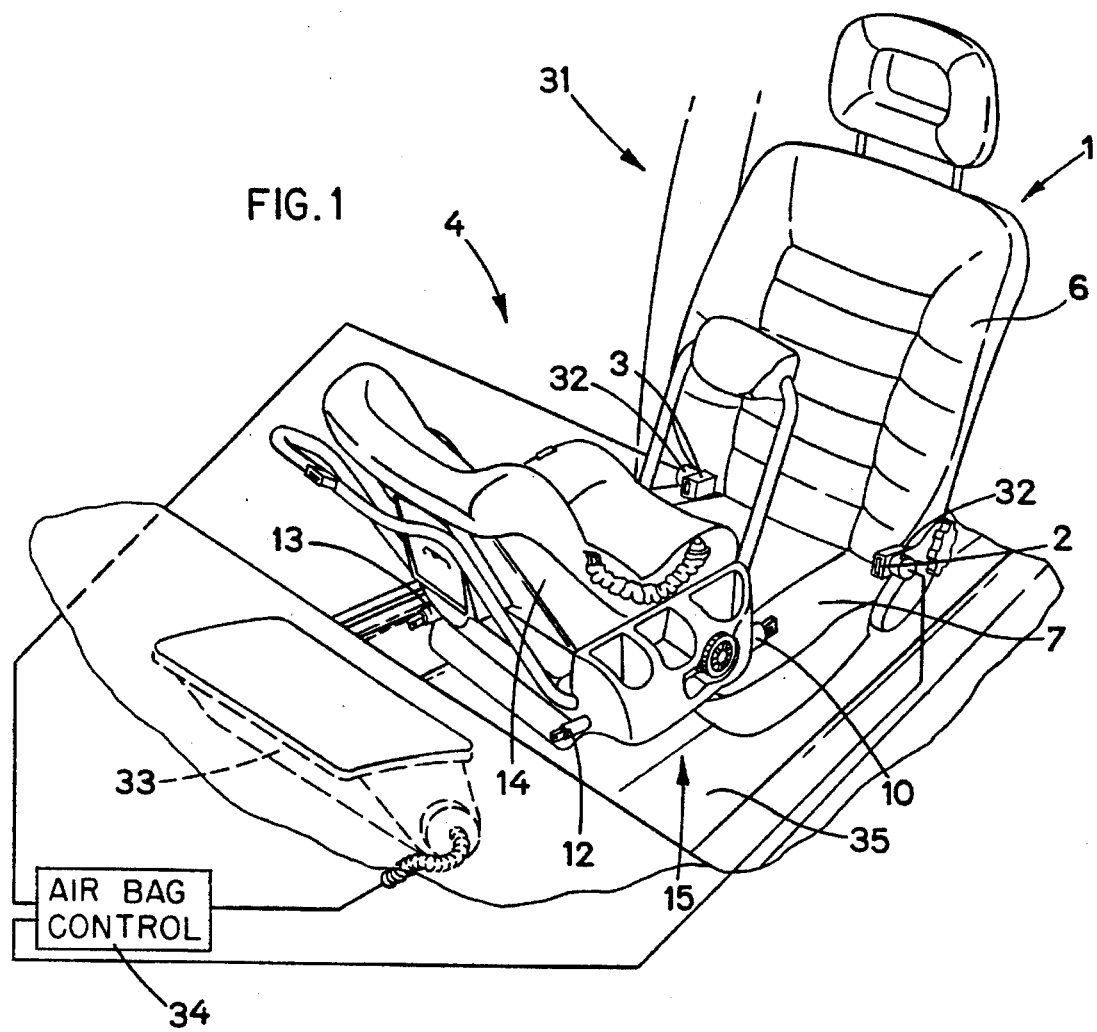
FIG. 1 is a perspective view of a passenger seat with the child's safety seat not yet attached.

A motor vehicle 31 has a passenger seat 1 and 18 with a child's safety seat 4 mountable on it. To attach the child's safety seat 4, as shown in FIG. 1, click-in seat belt-type attachment devices 2, 3 are provided on the passenger seat 1 which are connected on both sides of the seat cushion 7 in the region 8 of the stationary back rest metal fittings 21 (FIG. 5) to the supporting structure of the passenger seat 1.

As shown especially in FIG. 5, the attachment devices 2, 3 are in the form of seat belt female receptacles and are arranged between the back rest supports 21 and the back rest 6.

The attachment devices 2, 3 each contain a sensor 32, not shown in detail, which reacts to the attachment of the child's safety seat 4 to deactivate an air bag 33, which is not shown in detail and is located in the region in front of the back rest part 14 of the child's safety seat 4.

Figure 2:
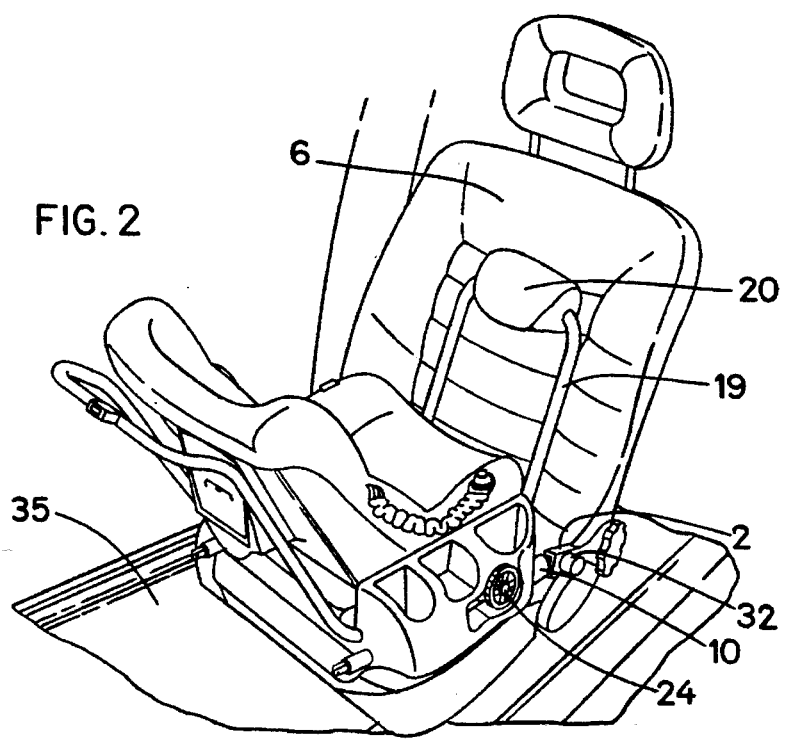
FIG. 2 is a perspective view of the passenger seat in FIG. 1 with the child's safety seat shown in FIG. 1 attached to the seat cushion.

To attach the child's safety seat 4, as shown in FIG. 2, the child's safety seat is plugged with its seat belt male latches or catches 10, 11 into the attachment devices 2, 3, at which time the support bracket 19 comes to lie against the back rest 6.

Upon the locking-in of the child's safety seat 4, each sensor designed as a pulse emitter generates a signal which acts on the air bag control 34, not shown in detail, and thus deactivates or turns off the air bag located in front of the child's safety seat 4. Although only a signal from one sensor is necessary to deactivate the air bag, in order to increase the safety, both attachment devices 2, 3 are equipped with sensors.

The signals of the sensors 32 are utilized to indicate an improper connection of the child's safety seat 4 with the passenger seat 1 or 18 via attachment devices 2, 3. The above signal of nonconnection is displayed on the vehicle's instrument panel (not shown).

Figure 3:
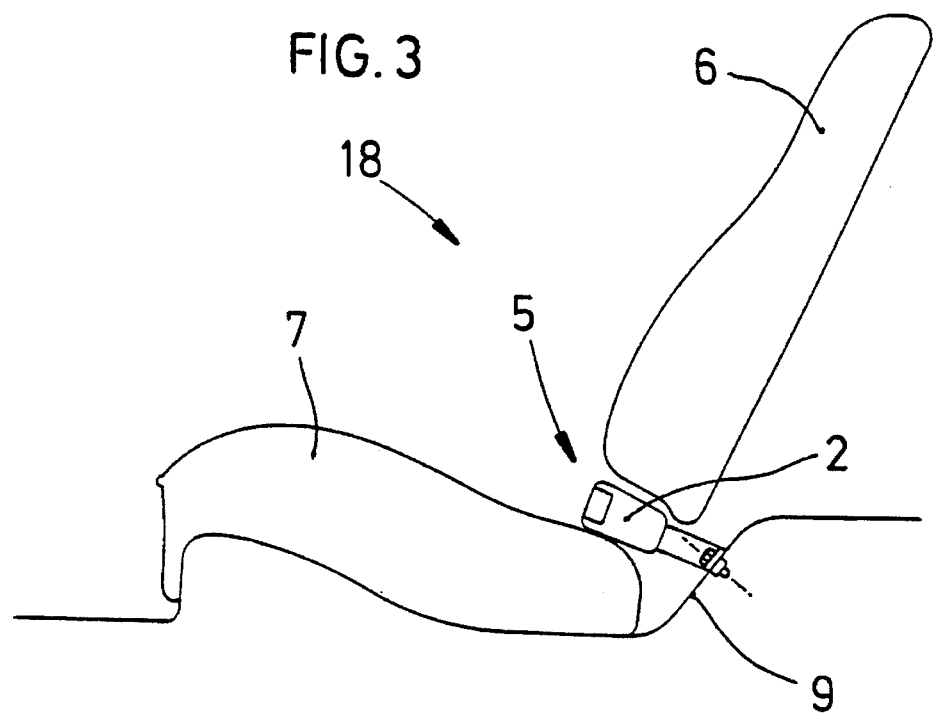
FIG. 3 is a side view of a passenger seat on the floor of the motor vehicle.
Figure 4:
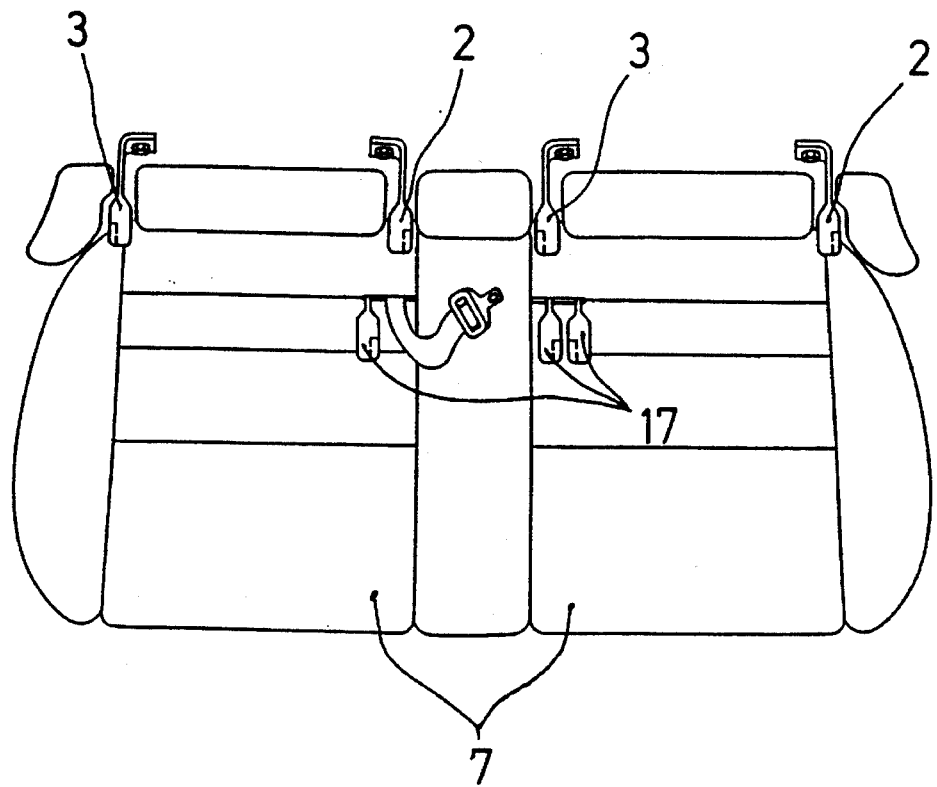
FIG. 4 is a top view of the passenger seat shown in FIG. 3 rotated in the plane of the drawings.

As shown in FIGS. 3 and 4, the child's safety seat may be attached to the passenger seat 18 even on the floor 35 (FIG. 1) of the motor vehicle. For this purpose, the attachment devices 2, 3 are arranged in the region of the neck 5 between the back rest 6 and the seat cushion 7. For secure holding of the child's safety seat, in this case the attachment devices 2, 3 are connected to the chassis 9 by means of a screw connection. The latter may therefore be removed at any time when necessary.

By this arrangement of the attachment devices 2, 3, confusion of the safety belt attachment device 17 located in the region of the center of the vehicle on the seat cushions 7 is prevented. The child's safety seat 4, which can be mounted on the passenger seat 1 or 18 as shown in FIG. 6, consists essentially of a supporting frame 16 to which the rigid seat shell 22, the bottom part 25 and the cushion 20 are attached. The seat shell 22 is equipped with its own belt suitable for holding a child. The bottom part 25 is attached below the seat shell 22 to the supporting frame 16. On the bottom part 25, pockets 26 are provided to hold various accessories such as the catching device 30 with rollers 24.

The support frame 16 in the seat-holding zone 15 has catches or seat back lock receptacles 10, 11, 12, 13 firmly connected to it which, upon the attachment of the child's safety seat 4, collaborate with the attachment devices 2, 3. All catches 10, 11, 12, 13 have the same form. When necessary, however, the catches 12, 13 facing toward the back rest part 14 of the seat support zone 15 may have a different shape from the catches 10, 11. Such a requirement exists, for example, when the catches 12, 13 are not to deactivate the air bag as opposed to catches 10, 11.

The support bracket 19 provided with a cushion part 20 on the support frame 16 is angled with respect to the seat-holding zone 15 in such a way that upon the attachment of the child's safety seat 4 to the passenger seat 1 or 18, it comes to lie against the back rest 6. The angle 28 between the support bracket 19 and the seat-holding zone 15 can be in the range of 90 to 135 degrees and preferably amounts to 105 degrees.

Figure 7:
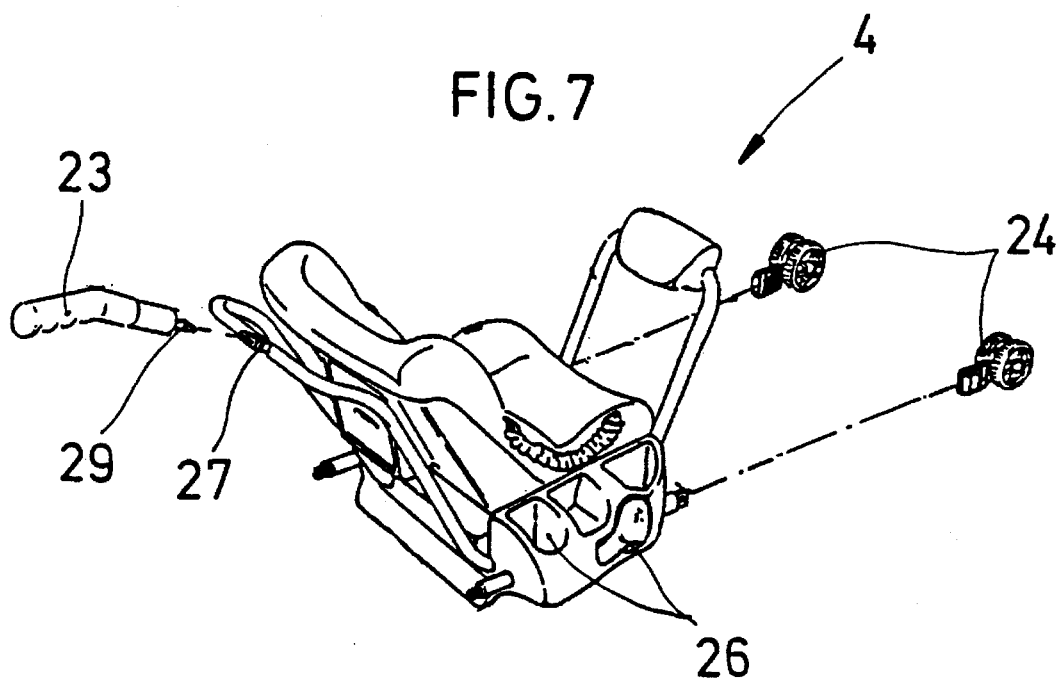
FIG. 7 is a perspective view of the child's safety seat in FIG. 1 with recommended accessory equipment.
Figure 8:
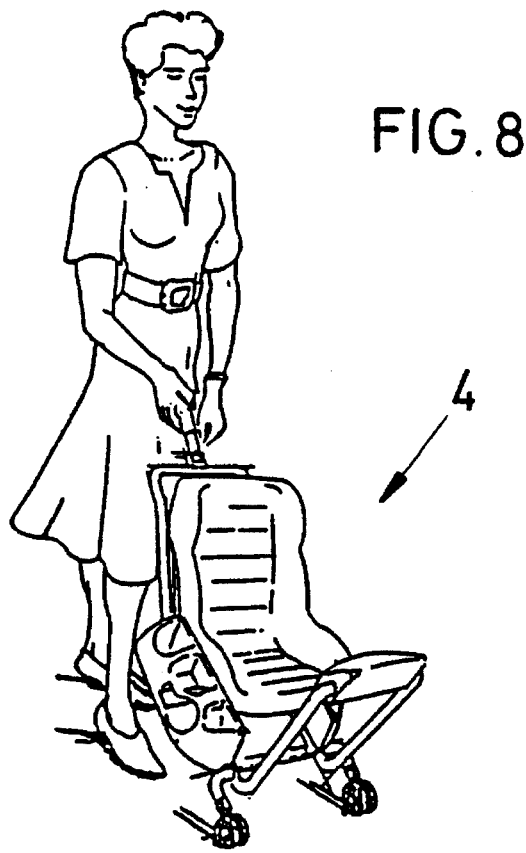
FIG. 8 is a perspective view of a child's safety seat that has been prepared for transportation on the street in use.

To carry a child outside of the motor vehicle on the street, the child's safety seat 4, as shown in FIGS. 7 and 8, has an additional catching device 27 on the side of the back rest part 14 on the upper horizontally running segment of the support frame 16 into which a holding grip 23 with a catch 29 can be plugged. The hand grip 23 and the catching devices 30 which can be attached to the catches 10, 11 may be stored in the pockets 26 in the bottom part 25 until use.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A motor vehicle with at least one passenger seat which has seat belt-type attachment devices for a child's safety seat to be secured thereon, the child safety seat having a supporting structure with fixably connected securing devices for connection to the seat belt-type attachment device, and the motor vehicle having at least one air bag in the region of the passenger seat, wherein at least one seat belt-type attachment device for the, child's safety seat is provided with a sensor, which reacts to the attachment of the child's safety seat, for deactivating the air bag.

2. A motor vehicle according to claim 1 wherein the sensor is constructed as a pulse generator to manufacture a signal acting on an air bag control to deactivate the air bag.

3. A motor vehicle according to claim 1 wherein the signal of the sensor deactivating the air bag is used to determine the connection of the child's safety seat to the passenger seat.

4. A motor vehicle according to claim 1 wherein the seat belt-type attachment device is constructed to be a female receptacle click-in securing device.

5. A motor vehicle according to claim 1 wherein the seat belt-type attachment devices are arranged on both sides of the seat cushion of the passenger seat.

6. A motor vehicle according to claim 1 wherein the seat belt-type attachment devices are arranged in the area of a neck between a back rest of the passenger seat and a seat cushion of the passenger seat.

7. A motor vehicle according to claim 1 wherein the attachment devices are arranged on both sides of the passenger seat in the region of the back rest supports.

8. A motor vehicle according to claim 1 wherein the seat belt-type attachment devices also are utilized to provide seat belt lock receptacles for safety belts which are provided for the passenger seat when the child's safety seat is not being used.

9. A motor vehicle according to claim 1 wherein the seat belt-type attachment devices are connected to a supporting structure of the passenger seat.

10. A motor vehicle according to claim 1 wherein the seat belt-type attachment devices are connected to a chassis of the motor vehicle.

11. A motor vehicle according to claim 1 wherein the child's safety seat supporting structure has a rigid seat shell which has cushioning and belts for securing the child into a seating bowl fitted within the shell.

12. A motor vehicle according to claim 11 wherein the child's safety seat securing devices are arranged on an end of the supporting structure facing away from a back rest of the child's safety seat.

13. A motor vehicle according to claim, 11 wherein the child's safety seat securing devices are additionally arranged on an end of the supporting structure facing away from a back rest of the child's safety seat.

14. A motor vehicle according to claim 11 wherein the child's safety seat supporting structure is constructed to be a supporting frame.

15. A motor vehicle according to claim 11 wherein the child's safety seat securing devices are constructed to be in the form of plug-in tongues for a safety belt lock receptacle.

16. A motor vehicle according to claim 11 wherein the child's safety seat supporting structure has a support bracket securely fixed to the same which is supported against a back rest of the passenger seat when the child's safety seat is secured to the passenger seat.

17. A motor vehicle according to claim 16 wherein the child's safety seat securing devices of the supporting structure receive catching devices provided with rollers, and the safety seat securing devices of the supporting structure have a catching device which receives a hand grip.

* * * * *